US012157312B2

(12) United States Patent
Kamiyama et al.

(10) Patent No.: US 12,157,312 B2
(45) Date of Patent: Dec. 3, 2024

(54) LIQUID DISCHARGE APPARATUS AND METHOD FOR CONTROLLING LIQUID DISCHARGE APPARATUS

(71) Applicant: SEIKO EPSON CORPORATION, Tokyo (JP)

(72) Inventors: Nobuaki Kamiyama, Matsumoto (JP); Keigo Takishima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 17/935,775

(22) Filed: Sep. 27, 2022

(65) Prior Publication Data

US 2023/0096012 A1 Mar. 30, 2023

(30) Foreign Application Priority Data

Sep. 29, 2021 (JP) ................................ 2021-158909

(51) Int. Cl.
*B41J 2/125* (2006.01)
*B41J 2/045* (2006.01)
*B41J 2/165* (2006.01)

(52) U.S. Cl.
CPC ........... *B41J 2/125* (2013.01); *B41J 2/04526* (2013.01); *B41J 2/16517* (2013.01); *B41J 2002/1657* (2013.01)

(58) Field of Classification Search
CPC .... B41J 2/125; B41J 2/04526; B41J 2/16517; B41J 2002/1657; B41J 2/16508; B41J 2/16532; B41J 2/16538; B41J 2/16579; B41J 2/17509
USPC ........................................................... 347/29
See application file for complete search history.

(56) References Cited

U.S. PATENT DOCUMENTS

| | | | | |
|---|---|---|---|---|
| 2009/0237435 | A1 | 9/2009 | Inoue | |
| 2018/0043699 | A1 * | 2/2018 | Sasaki | B41J 2/16579 |
| 2021/0299966 | A1 * | 9/2021 | Ito | B29C 64/35 |

FOREIGN PATENT DOCUMENTS

| | | | |
|---|---|---|---|
| JP | 2009-220059 | A | 10/2009 |
| JP | 2014-014952 | A | 1/2014 |
| JP | 2021-020362 | A | 2/2021 |

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A liquid discharge apparatus includes a liquid discharge portion configured to discharge a liquid from a nozzle provided in a nozzle surface and move in a X-axis direction, and a detection portion configured to detect a liquid droplet adhering to the nozzle surface, including an irradiating portion configured to radiate irradiation light along the nozzle surface in an irradiating direction intersecting the scanning direction, and a light receiving portion configured to receive the irradiation light radiated from the irradiating portion, in which in the liquid droplet detection of detecting the liquid droplet, the liquid discharge portion moves in the X-axis direction on a −Z direction side of the detection portion in a state where the irradiating portion is caused to radiate the irradiation light.

10 Claims, 7 Drawing Sheets

LIQUID DISCHARGE APPARATUS AND METHOD FOR CONTROLLING LIQUID DISCHARGE APPARATUS

The present application is based on, and claims priority from JP Application Serial Number 2021-158909, filed Sep. 29, 2021, the disclosure of which is hereby incorporated by reference herein in its entirety.

BACKGROUND

1. Technical Field

The present disclosure relates to a liquid discharge apparatus and a method for controlling a liquid discharge apparatus.

2. Related Art

JP-A-2009-220059 discloses an ink jet type printer as an example of a liquid discharge apparatus including a liquid discharge portion that discharges an ink as an example of a liquid from a nozzle provided in a nozzle surface and a detecting portion as an example of a detection portion. Further, JP-A-2009-220059 discloses that the detecting portion detects a position of a boundary with the ink bled from a nozzle by irradiating the nozzle surface with a laser beam emitted from an irradiating portion and receiving the laser beam reflected on the nozzle surface.

However, the detecting portion disclosed in JP-A-2009-220059 irradiates the nozzle surface with a plurality of laser beams obtained by a beam splitter splitting the laser beam as an example of irradiation light. Therefore, the entirety of the nozzle surface may not be irradiated with the laser beam. For example, when the detecting portion is applied to the detection of liquid droplets adhering to the nozzle surface, the detection of the liquid droplets may not be performed over the entirety of the nozzle surface.

SUMMARY

A liquid discharge apparatus includes a liquid discharge portion configured to discharge a liquid from a nozzle provided in a nozzle surface; a moving mechanism configured to move the liquid discharge portion in a scanning direction, when the liquid discharge portion performs printing on a medium by discharging the liquid from the nozzle; a detection portion configured to detect a liquid droplet adhering to the nozzle surface, the detection portion including an irradiating portion configured to radiate irradiation light along the nozzle surface in an irradiating direction intersecting the scanning direction, and a light receiving portion provided on an opposite side of the nozzle surface from the irradiating portion in the irradiating direction and configured to receive the irradiation light radiated from the irradiating portion; and a control portion. When liquid droplet detection of detecting the liquid droplet is performed a gap between the nozzle surface and the detection portion in a normal direction of the nozzle surface is set to a detection gap, in the liquid droplet detection, the control portion controls the irradiating portion to radiate the irradiation light, and the control portion controls the moving mechanism to move the liquid discharge portion of which the gap is set to the detection gap in the scanning direction.

A method for controlling a liquid discharge apparatus including a liquid discharge portion configured to discharge a liquid from a nozzle provided in a nozzle surface and move in a scanning direction when the liquid discharge portion performs printing on a medium by discharging the liquid from the nozzle, and a detection portion configured to detect a liquid droplet adhering to the nozzle surface, the detection portion including an irradiating portion configured to radiate irradiation light along the nozzle surface in an irradiating direction intersecting the scanning direction, and a light receiving portion provided on an opposite side of the nozzle surface from the irradiating portion in the irradiating direction and configured to receive the irradiation light radiated from the irradiating portion. The method includes, when liquid droplet detection of detecting the liquid droplet is performed, a gap between the nozzle surface and the detection portion in a normal direction of the nozzle surface is set to a detection gap, moving, in the liquid droplet detection, in a state where the irradiating portion is caused to radiate the irradiation light, the liquid discharge portion of which the gap is set to the detection gap in the scanning direction.

DESCRIPTION OF EXEMPLARY EMBODIMENTS

Figure 1:
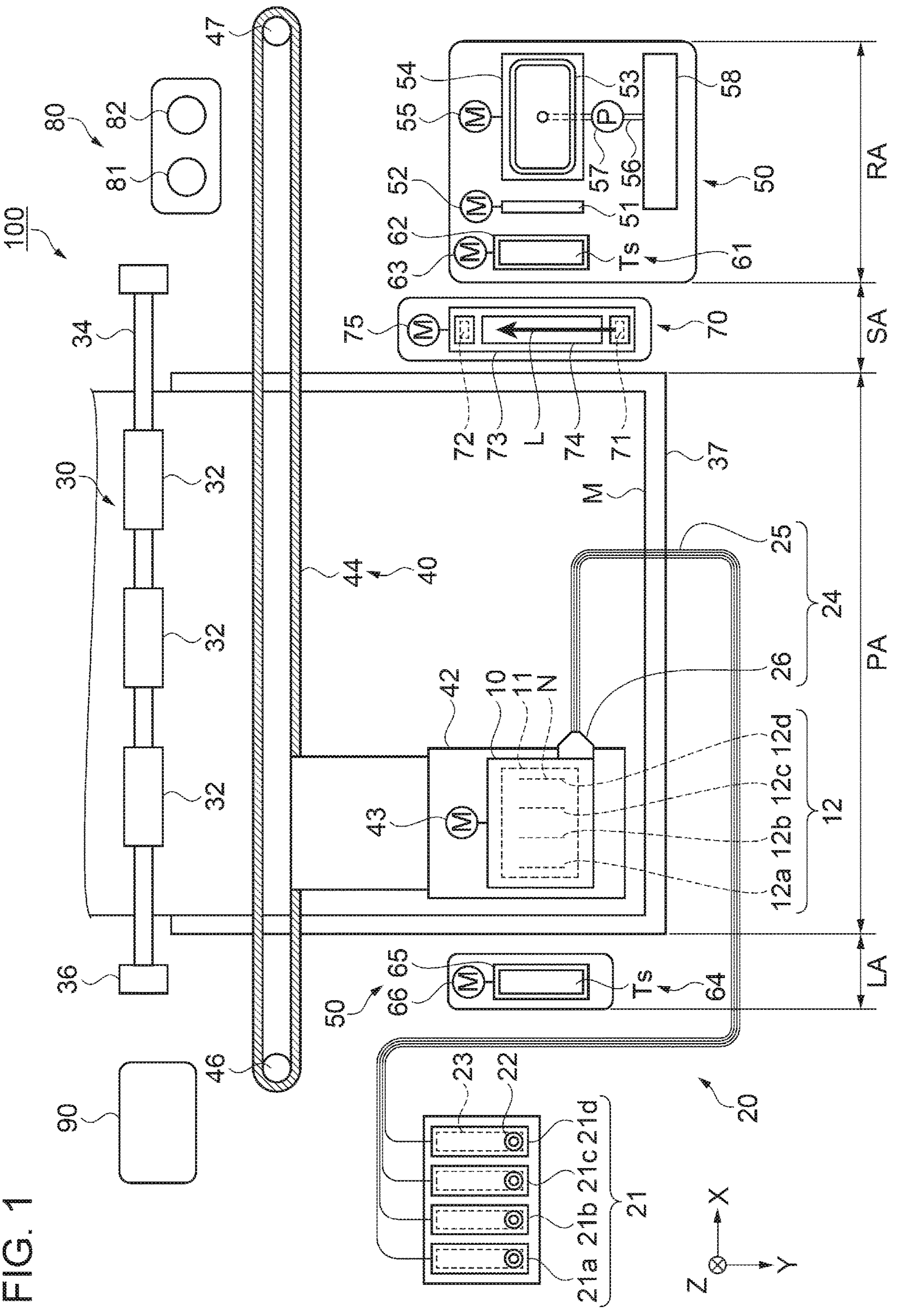
FIG. 1 is a schematic plan view illustrating a schematic configuration of a liquid discharge apparatus as an embodiment of the present disclosure.

Hereinafter, the present disclosure will be described based on an embodiment. The same reference numeral are given to the same member in the drawings, and a redundant description thereof will be omitted. In the present specification, the expression "same" not only indicates "completely the same" but also indicates "the same when a measurement error is taken into account", "the same when manufacturing variations of members are taken into account", and "the same in a range in which a function is not impaired". Therefore, the expression "both dimensions are the same" indicates that a difference in both dimensions is within ±10%, more preferably within ±5%, or particularly preferably within ±3% in consideration of the measurement error and the manufacturing variation of members.

In the drawings, X, Y, and Z represents three spatial axes orthogonal to one another. In the present specification, directions along these axes are defined as an X-axis direction, a Y-axis direction, and a Z-axis direction, respectively. When specifying a direction, a positive direction is defined as "+", and a negative direction is defined as "−". Positive and negative signs are used together to indicate directions, and a direction in which an arrow in each drawing is directed is described as a "+" direction and a direction opposite to the arrow is described as a "−" direction.

The Z-axis direction indicates a gravity direction, a +Z direction indicates a vertically downward direction, and a −Z direction indicates a vertically upward direction. A plane including the X and Y axes is described as an X-Y plane, a plane including the X and Z axes is described as an X-Z plane, and a plane including the Y and Z axes is described as a Y-Z plane. The X-Y plane is defined as a horizontal plane. Further, the three spatial axes of X, Y, and Z without limitation of positive direction or negative direction are described as the X axis, the Y axis, and the Z axis, respectively.

1. First Embodiment

In the present embodiment, a liquid discharge apparatus 100 is configured as an ink jet type printer and discharges an ink onto printing paper M to form an image. The printing paper M is an example of a medium. The ink is an example of a liquid. Instead of the printing paper M, any type of the medium, such as a resin film or cloth, may be used as an object onto which the ink is discharged.

As illustrated in FIG. 1, the liquid discharge apparatus 100 includes a liquid discharge portion 10, an ink supply portion 20, a transport mechanism 30, a moving mechanism 40, a maintenance portion 50, a liquid droplet detection mechanism 70, a temperature/humidity sensor 80, and a control portion 90.

The liquid discharge portion 10 has a nozzle surface 11 in which a plurality of nozzle rows 12 for discharging the ink in the +Z direction are provided. The liquid discharge portion 10 is mounted on a carriage 42 (described later) in such a posture that the nozzle surface 11 is along the X-Y plane. The Z-axis direction along the +Z direction is an example of a normal direction of the nozzle surface 11. The nozzle row 12 is formed by arranging a plurality of nozzles N in the Y-axis direction. In a printing region PA, the liquid discharge portion 10 discharges the ink from the plurality of nozzles N constituting the nozzle row 12 in the +Z direction and performs printing on the printing paper M. In the present embodiment, the plurality of nozzle rows 12 include a nozzle row 12*a*, a nozzle row 12*b*, a nozzle row 12*c*, and a nozzle row 12*d*.

Examples of the ink to be discharged include inks of the total of four colors, such as black, cyan, magenta, and yellow, and the inks may be each discharged from the nozzle row 12*a*, the nozzle row 12*b*, the nozzle row 12*c*, and the nozzle row 12*d*. The color is not limited to the four colors described above, and any ink of colors, such as light cyan, light magenta, and white may be discharged. The liquid discharge portion 10 is mounted on the carriage 42 (described later) of the moving mechanism 40 and reciprocates in the X-axis direction with the movement of the carriage 42. The X-axis direction is an example of a scanning direction. In the present embodiment, the scanning direction is the +X direction and the −X direction.

The ink supply portion 20 supplies the ink to the liquid discharge portion 10. The ink supply portion 20 includes a liquid supply source 21 and a supply flow path 24. The liquid supply source 21 of the present embodiment is a replenishment type tank including an injection portion 22 through which the ink can be injected and an accommodation chamber 23 accommodating the ink injected through the injection portion 22. However, the liquid supply source 21 may be an exchangeable cartridge type tank. The ink supply portion 20 includes a plurality of liquid supply sources 21. In the present embodiment, the plurality of liquid supply sources 21 include a liquid supply source 21*a* for accommodating a black ink, a liquid supply source 21*b* for accommodating a cyan ink, a liquid supply source 21*c* for accommodating a magenta ink, and a liquid supply source 21*d* for accommodating a yellow ink.

The supply flow path 24 couples the liquid supply source 21 and the liquid discharge portion 10 so that the ink accommodated in the liquid supply source 21 flows toward the liquid discharge portion 10. The supply flow path 24 of the present embodiment includes a coupling member 26 provided on the carriage 42 and coupled with the liquid discharge portion 10, and a tube 25 for coupling the liquid supply source 21 and the coupling member 26.

The transport mechanism 30 transports the printing paper M in the Y-axis direction. The Y-axis direction is an example of a transporting direction. The transporting direction is a direction orthogonal to the X-axis direction, which is an example of the scanning direction, and in the present embodiment, the transporting direction is the +Y direction and the −Y direction. The transport mechanism 30 includes a transport rod 34 on which three transport rollers 32 are mounted, a transport motor 36 rotating the transport rod 34, and a medium support portion 37 supporting the printing paper M. The medium support portion 37 is provided in the printing region PA. When the transport motor 36 rotates the transport rod 34, the plurality of transport rollers 32 are rotated, and the printing paper M is transported on the medium support portion 37 that is provided in the +Y direction with respect to the transport roller 32. The number of the transport rollers 32 is not limited to three and may be any number. In addition, a plurality of transport mechanisms 30 may be provided.

The moving mechanism 40 includes a head moving portion 43, a transport belt 44, a moving motor 46, and a pulley 47, in addition to the carriage 42. The carriage 42 has the liquid discharge portion 10 mounted in a state where the nozzle surface 11 is along the X-Y plane and the ink can be discharged from the nozzles N in the +Z direction. The carriage 42 is attached to the transport belt 44. The transport belt 44 is wound between the moving motor 46 and the pulley 47. When the moving motor 46 is rotated, the transport belt 44 reciprocates in the X-axis direction.

When the moving motor 46 is rotated, the carriage 42 attached to the transport belt 44 also reciprocates in the X-axis direction. As a result, the carriage 42 reciprocates in the X-axis direction on the −Z direction side of the printing region PA, a maintenance region LA on the −X direction side of the printing region PA in the X-axis direction, a detection region SA on the +X direction side of the printing region PA in the X-axis direction, and a maintenance region RA on the +X direction side of the detection region SA in the X-axis direction. The moving mechanism 40 moves the liquid discharge portion 10 in the X-axis direction, when the liquid discharge portion 10 performs printing on the printing paper M by discharging the ink from the nozzles N.

When the head moving portion 43 is driven, the liquid discharge portion 10 moves in the Z-axis direction with respect to the carriage 42. As a result, a gap PG between the nozzle surface 11 of the liquid discharge portion 10 and the printing paper M is changed. In other words, the carriage 42 holds the liquid discharge portion 10 so as to be movable in the Z-axis direction with respect to the printing paper M supported by the medium support portion 37.

The maintenance portion 50 performs maintenance of the liquid discharge portion 10. The maintenance portion 50 includes a wiper 51, a wiper moving portion 52, a cap 53, a cap holding portion 54, a cap moving portion 55, a waste liquid tube 56, a suction pump 57, and a waste liquid collecting portion 58. The maintenance portion 50 further includes removal members 61 and 64, removal member holders 62 and 65, and holder moving portions 63 and 66. The removal members 61 and 64 are examples of a cleaning portion.

The wiper 51, the wiper moving portion 52, the cap 53, the cap holding portion 54, the cap moving portion 55, the waste liquid tube 56, the suction pump 57, the waste liquid collecting portion 58, the removal member 61, the removal member holder 62, and the holder moving portion 63 are provided in the maintenance region RA. The removal member 64, the removal member holder 65, and the holder moving portion 66 are provided in the maintenance region LA. The maintenance region RA or LA is an example of a region different from the printing region PA.

The wiper 51 wipes the nozzle surface 11 of the liquid discharge portion 10 to perform the maintenance of the liquid discharge portion 10. When the wiper moving portion 52 is driven, the wiper 51 moves in the Z-axis direction between a standby position where the wiper 51 is not brought into contact with the nozzle surface 11 and a wiping position where the wiper 51 can be brought into contact with the nozzle surface 11. In a state where the wiper 51 is in the wiping position, the liquid discharge portion 10 moves in the scanning direction on the −Z direction side of the wiper 51 with the movement of the carriage 42, and thus the wiper 51 wipes the nozzle surface 11.

The ink is caused to be discharged through the cap 53 form the nozzles N of the liquid discharge portion 10 to perform the maintenance of the liquid discharge portion 10. The cap 53 is brought into contact with the nozzle surface 11 of the liquid discharge portion 10 to form a suction space in which the plurality of nozzles N are opened. The cap 53 is held by the cap holding portion 54. The cap holding portion 54 moves in the Z-axis direction when the cap moving portion 55 is driven. By the cap holding portion 54 moving in the Z-axis direction, the cap 53 moves in the Z-axis direction between a non-capping position where the cap 53 is not brought into contact with the nozzle surface 11 and a suctionable position where the cap 53 is brought into contact with the nozzle surface 11. The cap 53 communicates with the waste liquid collecting portion 58 collecting a waste liquid through the waste liquid tube 56. The waste liquid tube 56 is provided with a suction pump 57 for performing suctioning of a suction space formed by the cap 53.

When the cap 53 performs maintenance of the liquid discharge portion 10, the liquid discharge portion 10 moves to a position where the nozzle rows 12*a*, 12*b*, 12*c*, and 12*d* face the cap 53 with the movement of the carriage 42 in a state where the cap 53 is at the non-capping position. When the cap 53 moves to the suctionable position, the suction space is formed in which the plurality of nozzles N constituting the nozzle rows 12*a*, 12*b*, 12*c*, and 12*d* are opened. When the suction pump 57 performs suctioning in the formed suction space, the ink is discharged from the plurality of nozzles N constituting the nozzle rows 12*a*, 12*b*, 12*c*, and 12*d* to the suction space. The ink discharged to the suction space is collected by the waste liquid collecting portion 58 through the waste liquid tube 56.

When a printing operation is not performed, the cap 53 at the suctionable position caps the nozzle surface 11 of the liquid discharge portion 10, thereby suppressing evaporation of a solvent in the ink from the nozzles N. Therefore, as the standby position of the carriage 42, the carriage 42 is positioned on the −Z direction side of the cap 53, and as the standby position of the liquid discharge portion 10, the nozzle surface 11 faces the cap 53.

Figure 2:
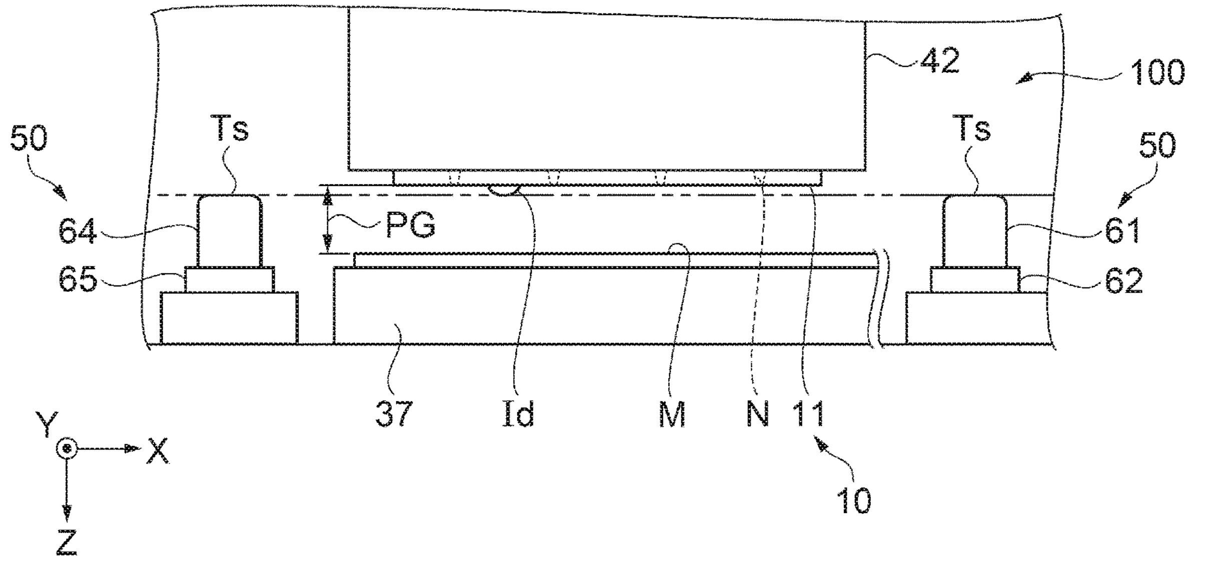
FIG. 2 is a side view illustrating a configuration of a removal member as the embodiment of the present disclosure.

As illustrated in FIGS. 1 and 2, the removal member 61 is provided on the +X direction side of the medium support portion 37. The removal member 64 is provided on the −X direction side of the medium support portion 37. The removal members 61 and 64 remove a liquid droplet Id adhering to the liquid discharge portion 10 to perform the maintenance of the liquid discharge portion 10. The removal members 61 and 64 are formed by an absorber capable of absorbing a liquid including the ink. The removal members 61 and 64 are held by the removal member holders 62 and 65 so as to be exchangeable. In addition, the removal members 61 and 64 are held by the removal member holders 62 and 65 through an elastic body (not illustrated). As the elastic body, for example, urethane foam, silicon rubber, sponge-like silicon rubber, and the like can be adopted.

The removal member holder 62 or 65 moves in the Z-axis direction by the holder moving portion 63 or 66 being driven. As a result, the removal member 61 or 64 move in the Z-axis direction between the standby position away from the nozzle surface 11 and a removal position closer to the nozzle surface 11 than the standby position. The removal position is a position where the removal member 61 or 64 can be brought into contact with the liquid droplet Id adhering to the nozzle surface 11.

For example, in a state where the removal member 61 is at the standby position, the carriage 42 moves to a position where the liquid droplet Id adhering to the nozzle surface 11 faces an upper surface Ts which is a surface of the removal member 61 in the −Z direction. Then, the removal member 61 moves from the standby position to the removal position, and brought into contact with the liquid droplet Id adhering to the nozzle surface 11, thus removing the liquid droplet Id. In addition, for example, in a state where the removal member 64 is at the removal position, the liquid discharge portion 10 moves in the X-axis direction on the −Z direction side of the removal member 64 with the movement of the carriage 42, the removal member 64 may thus remove a plurality of liquid droplets Id adhering to the entirety of the nozzle surface 11 along the X-axis direction.

When the removal member 61 or 64 is at the removal position, the upper surface Ts of the removal member 61 or 64 may or may not be in contact with the nozzle surface 11 of the liquid discharge portion 10. For example, a position of the upper surface Ts indicated by a two-dot chain line may be away from the position of the nozzle surface 11 in the +Z direction as illustrated in FIG. 2, as long as the upper surface Ts can be brought into contact with the liquid droplet Id adhering to the liquid discharge portion 10.

Figure 3:
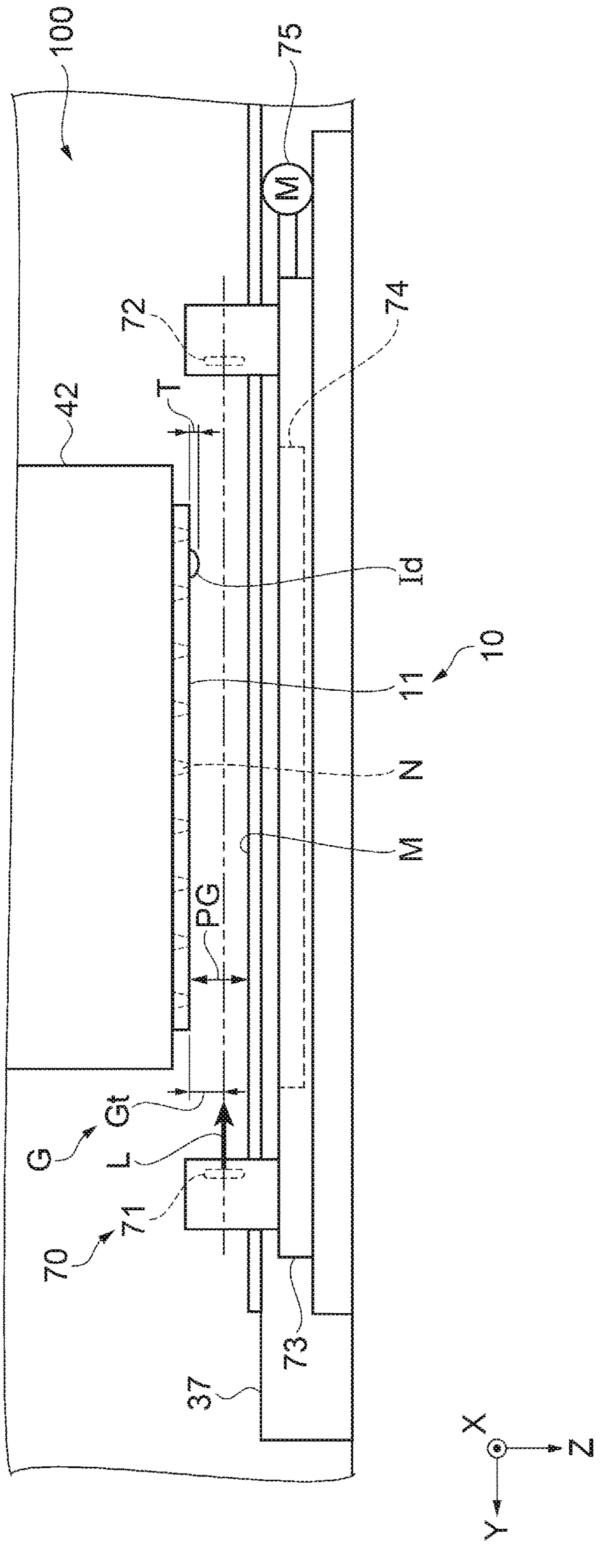
FIG. 3 is a side view illustrating a configuration of a liquid droplet detection mechanism as the embodiment of the present disclosure.

The liquid droplet detection mechanism 70 can detect the liquid droplet Id adhering to the nozzle surface 11 of the liquid discharge portion 10. The liquid droplet Id is an example of a liquid adhering to the nozzle surface 11 of the liquid discharge portion 10. As illustrated in FIG. 1, the liquid droplet detection mechanism 70 is provided on the +X direction side of the medium support portion 37 in the X-axis direction. The liquid droplet detection mechanism 70 is provided in the detection region SA. Thus, the liquid droplet detection mechanism 70 is provided between the removal member 61 and the removal member 64 in the X-axis direction. As illustrated in FIGS. 1 and 3, the liquid droplet detection mechanism 70 includes a detection portion 73 and a detection portion moving mechanism 75. The detection portion 73 includes an irradiating portion 71, a light receiving portion 72, and a liquid receiving portion 74.

The irradiating portion 71 is positioned on the +Y direction side of the nozzle surface 11. The light receiving portion 72 is positioned on the −Y direction side of the irradiating portion 71. That is, the light receiving portion 72 is provided on a side of the irradiating portion 71 opposite to the nozzle surface 11 in the Y-axis direction. The irradiating portion 71 and the light receiving portion 72 are provided in the detection portion 73 in the Y-axis direction so that the nozzle surface 11 is positioned between the irradiating portion 71 and the light receiving portion 72.

Further, the detection portion 73 includes the liquid receiving portion 74 at a position between the irradiating portion 71 and the light receiving portion 72 in the Y-axis direction. The liquid receiving portion 74 is formed by an absorber capable of absorbing the liquid. The liquid receiving portion 74 receives the ink discharged from the nozzles N of the liquid discharge portion 10. Therefore, a dimension of the liquid receiving portion 74 in the Y-axis direction is larger than that of the nozzle row 12 in the Y-axis direction.

As indicated by a solid line arrow in FIGS. 1 and 3, the irradiating portion 71 radiates irradiation light L toward the light receiving portion 72 in the −Y direction along the nozzle surface 11. The Y-axis direction along the −Y direction is an example of an irradiating direction intersecting the X-axis direction along the nozzle surface 11. In the present embodiment, the irradiation light L is a laser beam, but may be visible light such as red light, green light, or blue light, or infrared light. The light receiving portion 72 receives the irradiation light L radiated from the irradiating portion 71. The detection portion 73 of the present embodiment is a so-called transmissive photoelectric sensor including the irradiating portion 71 radiating the irradiation light L and the light receiving portion 72 receiving the radiated irradiation light L.

The detection portion 73 including the irradiating portion 71 and the light receiving portion 72 moves in the Z-axis direction by driving the detection portion moving mechanism 75. In other words, by driving the detection portion moving mechanism 75, a gap G, which is a distance in the Z-axis direction between the nozzle surface 11 and the center of the irradiating portion 71 indicated by a two-dot chain line in FIG. 3, is changed. The gap G is an example of a gap between the nozzle surface 11 and the detection portion 73 in the Z-axis direction. The two-dot chain line in FIG. 3 is a straight line passing through the center of the irradiating portion 71 and the center of the light receiving portion 72, and is a straight line along the Y axis.

Figure 4:
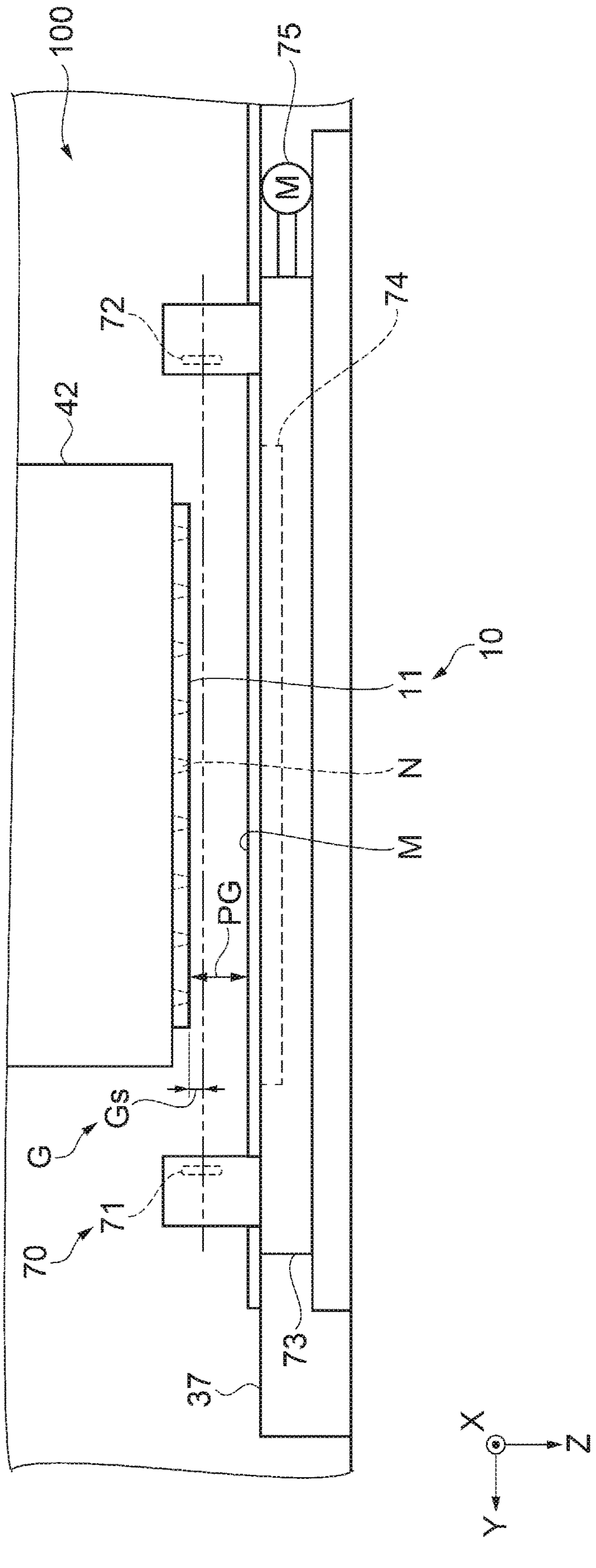
FIG. 4 is a side view illustrating the liquid droplet detection mechanism in which a detection portion is at a detection position.

When performing liquid droplet detection to detect the liquid droplet Id adhering to the nozzle surface 11 of the liquid discharge portion 10, the detection portion 73 drives the detection portion moving mechanism 75 to move from the standby position away from the nozzle surface 11 in the +Z direction illustrated in FIG. 3 to a liquid droplet detection position illustrated in FIG. 4. As a result, the gap G is changed from a standby gap Gt at the standby position to a detection gap Gs at the liquid droplet detection position. The liquid droplet detection position is closer to the nozzle surface 11 than the standby position in the Z-axis direction, and the detection gap Gs is smaller than the standby gap Gt.

As illustrated in FIG. 3, when a protrusion amount of the liquid droplet Id adhering to the nozzle surface 11 from the nozzle surface 11 to the +Z direction is defined as T, a width dimension of light flux of the irradiation light L radiated from the irradiating portion 71 is set sufficiently smaller than the protrusion amount T. Therefore, in the present embodiment, the detection gap Gs is set to be the same as a detected protrusion amount Th of the liquid droplet Id from the nozzle surface 11 to the +Z direction illustrated in FIG. 6. As the protrusion amount T is large, a size of the liquid droplet Id is large. Also, when a force is applied to the liquid droplet Id due to the movement of the carriage 42 or the like, the larger the protrusion amount T, the easier the liquid droplet Id is to fall off from the nozzle surface 11. The liquid droplet Id of which the protrusion amount T is the detected protrusion amount Th may fall off from the nozzle surface 11 during printing. That is, the protrusion amount T of the liquid droplet Id that may fall off from the nozzle surface 11 during the printing is the detected protrusion amount Th.

Figure 6:
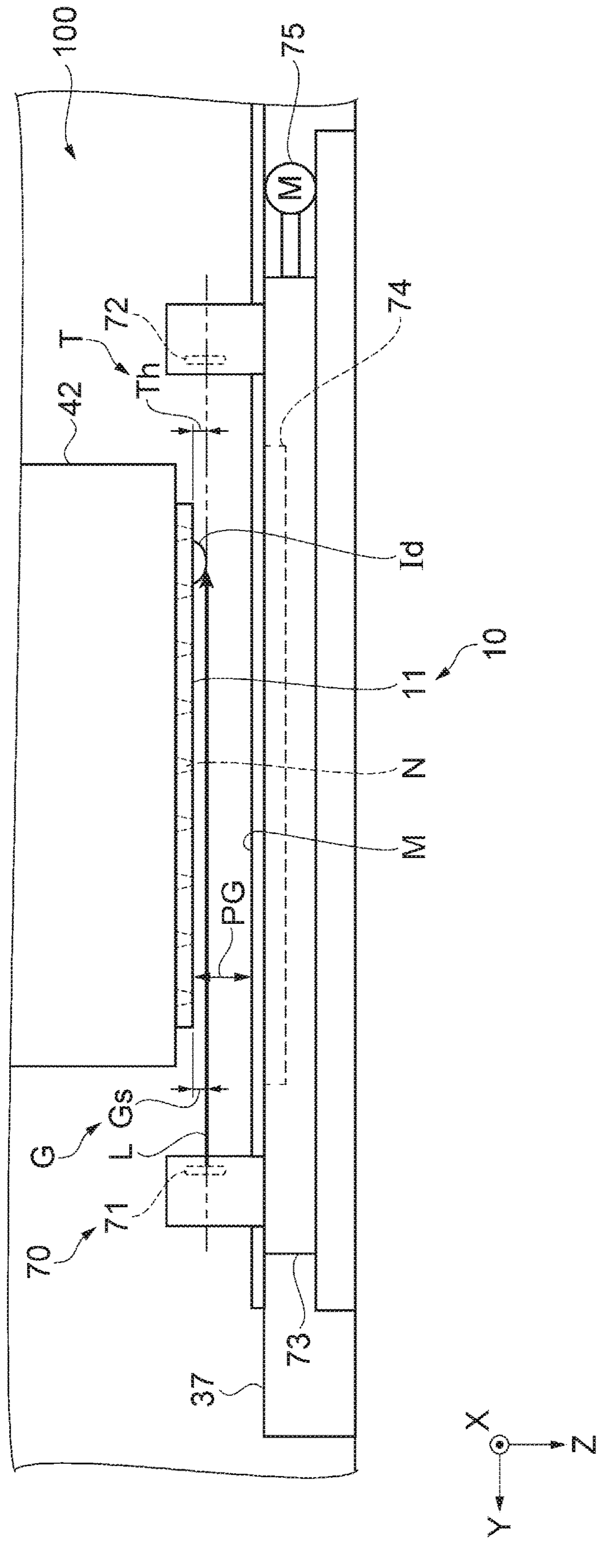
FIG. 6 is a side view illustrating a state of liquid droplet detection in which a liquid droplet is detected.

For example, when the irradiation light L is radiated from the irradiating portion 71, a light receiving amount of the irradiation light L received by the light receiving portion 72 is defined as RA. As illustrated in FIG. 6, the liquid droplet detection is performed in a state where the liquid droplet Id adheres to the nozzle surface 11 and the protrusion amount T of the liquid droplet Id is the detected protrusion amount Th. In this case, at least a part of the irradiation light L radiated from the irradiating portion 71 is blocked by the liquid droplet Id. Here, the light receiving amount RA of the irradiation light L received by the light receiving portion 72 is defined as a detected light receiving amount RAt. When the irradiation light L is radiated from the irradiating portion 71 in a state in which there is no foreign matter that blocks the irradiation light L radiated from the irradiating portion 71, the detected light receiving amount RAt is set to be smaller than the light receiving amount RA of the irradiation light L received by the light receiving portion 72.

Figure 5:
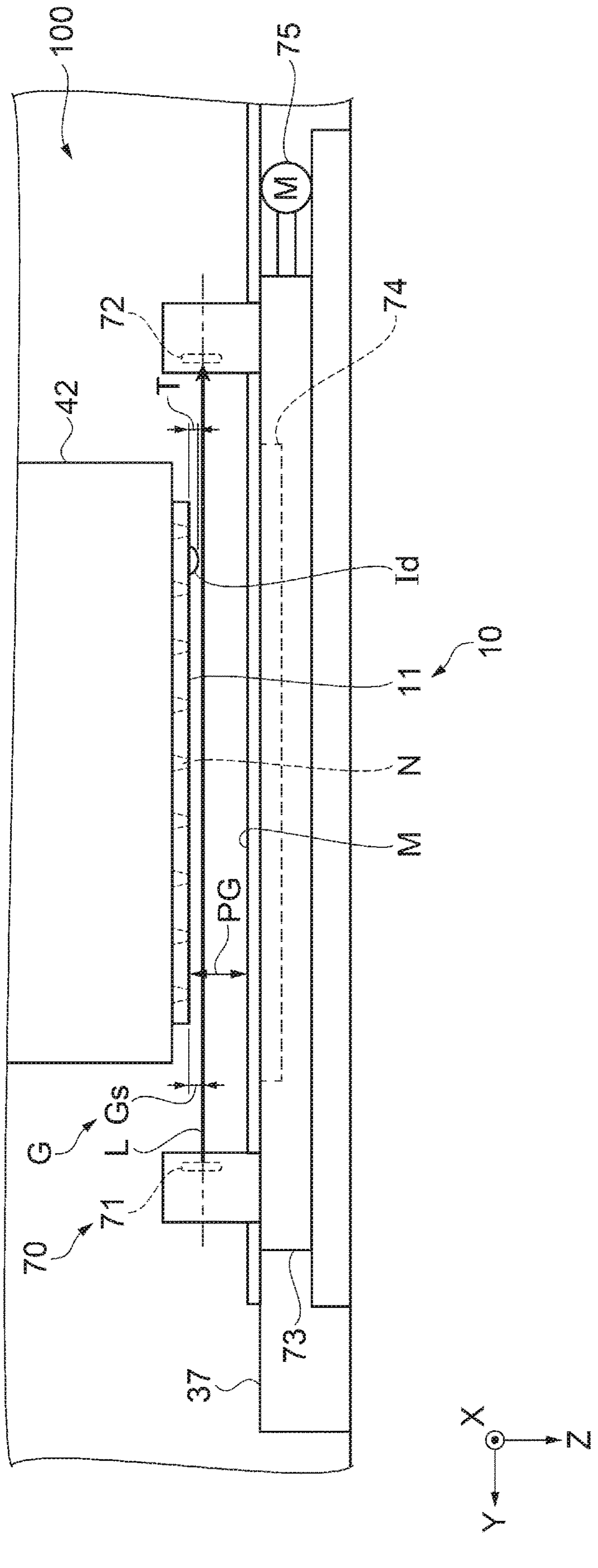
FIG. 5 is a side view illustrating a state of liquid droplet detection in which a liquid droplet is not detected.

On the other hand, it is assumed that the liquid droplet detection is performed in a state where there is no liquid droplet Id on the nozzle surface 11 or in a state where the liquid droplet Id of which the protrusion amount T is smaller than the detected protrusion amount Th adheres to the nozzle surface 11 as illustrated in FIG. 5. In this case, the light receiving amount RA of the irradiation light L that is radiated from the irradiating portion 71 and received by the light receiving portion 72 is larger than the detected light receiving amount RAt. In the present embodiment, the liquid droplet Id adhering to the nozzle surface 11 is detected in the liquid droplet detection mechanism 70 by the liquid droplet detection, based on the light receiving amount RA of the irradiation light L received by the light receiving portion 72.

Specifically, in the liquid droplet detection by the liquid droplet detection mechanism 70, when the light receiving amount RA of the irradiation light L received by the light receiving portion 72 is the same as or smaller than the detected light receiving amount RAt, it is determined that the liquid droplet Id of which the protrusion amount T is the same as or larger than the detected protrusion amount Th adheres to the nozzle surface 11. Further, in the liquid droplet detection by the liquid droplet detection mechanism 70, when the light receiving amount RA of the irradiation light L received by the light receiving portion 72 is larger than the detected light receiving amount RAt, it is determined that the liquid droplet Id of which the protrusion amount T is the same as or larger than the detected protrusion amount Th does not adhere to the nozzle surface 11.

A size of the detected liquid droplet Id can be changed by changing the detection gap Gs when the detected light receiving amount RAt is not changed. Alternatively, the size of the detected liquid droplet Id can be changed by changing the detected light receiving amount RAt when the detection gap Gs is not changed. In this case, the detection gap Gs may be different from the protrusion amount T of the detected liquid droplet Id. The detected light receiving amount RAt is set based on relationship data between the protrusion amount T of the liquid droplet Id and the light receiving amount RA verified in advance by an experiment or the like.

For example, the relationship data is obtained by verifying in advance by an experiment or the like, such as changing the light receiving amount RA when the gap G is changed in a state where the liquid droplet Id of which the protrusion amount T is the detected protrusion amount Th adheres to the nozzle surface 11, and changing the light receiving amount RA when the protrusion amount T of the liquid droplet Id adhering to the nozzle surface 11 is changed in a state where the gap G is set as the detection gap Gs.

As illustrated in FIG. 1, the temperature/humidity sensor 80 is provided in the liquid discharge apparatus 100. The temperature/humidity sensor 80 detects temperature and humidity of atmosphere in which the liquid discharge portion 10 is provided. The temperature/humidity sensor 80 includes a temperature detection portion 81 that detects the temperature of atmosphere in which the liquid discharge portion 10 is provided, and a humidity detection portion 82 that detects the humidity of atmosphere in which the liquid discharge portion 10 is provided.

The control portion 90 controls the overall liquid discharge apparatus 100. For example, the control portion 90 controls a reciprocating operation of the carriage 42 in the X-axis direction, a transport operation of the printing paper M in the Y-axis direction, an ink discharge operation of the liquid discharge portion 10, a maintenance operation by the maintenance portion 50, and a detection operation of the liquid droplet Id by the liquid droplet detection mechanism 70. The control portion 90 may be composed of, for example, a processing circuit such as a central processing unit (CPU) or a field programmable gate array (FPGA), and a storage circuit such as a semiconductor memory.

Next, the detection operation of the liquid droplet Id by the liquid droplet detection mechanism 70 will be described. For example, in a state where the liquid droplet Id of which the protrusion amount T is the detected protrusion amount Th adheres to the nozzle surface 11 as illustrated in FIG. 6, the liquid discharge portion 10 discharges the ink from the nozzles N and performs printing while moving above the printing paper M in the X-axis direction. In this case, the liquid droplet Id may fall off the printing paper M and contaminate the printing paper M. In addition, ink mist may be generated due to the discharge of the ink from the nozzles N during printing. In addition, the ink mist adheres to the nozzle surface 11 and becomes the liquid droplet Id. Furthermore, the liquid droplet Id grows to the liquid droplet Id of which the protrusion amount T is the detected protrusion amount Th, and falls off from the nozzle surface 11 to the printing paper M, such that the printing paper M may be contaminated.

Therefore, the liquid discharge apparatus 100 of the present embodiment performs the liquid droplet detection by the liquid droplet detection mechanism 70, at the time of printing in which the ink is discharged from the nozzles N of the liquid discharge portion 10 and performs printing on the printing paper M and at the time of non-printing in which the printing is not performed on the printing paper M. The time of non-printing includes, for example, before performing printing on the printing paper M, after performing printing on the printing paper M, immediately after supplying power of the liquid discharge apparatus 100, and immediately before cutting off power of the liquid discharge apparatus 100. The liquid droplet detection performed at the time of printing is referred to as printing detection, and the liquid droplet detection performed at the time of non-printing is referred to as non-printing detection.

Figure 7:
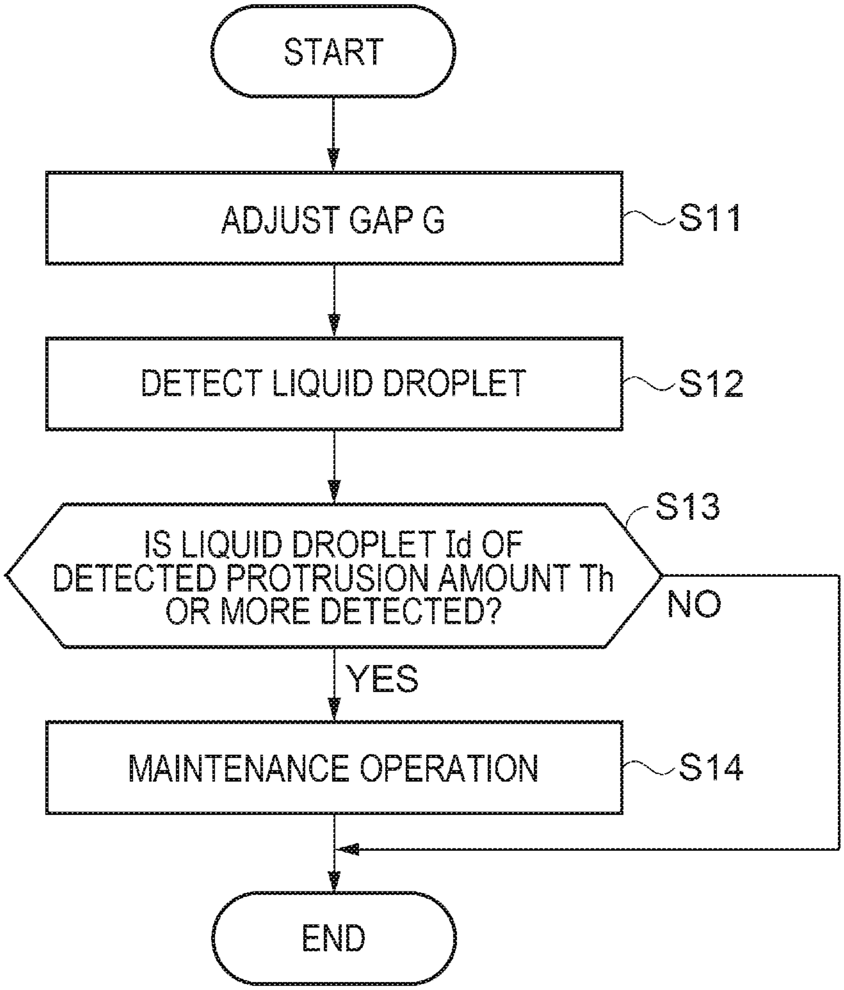
FIG. 7 is a flowchart illustrating a flow of a process when the liquid droplet detection is performed.

Next, a flow of a process when the control portion 90 performs the liquid droplet detection in the present embodiment will be described with reference to a flowchart illustrated in FIG. 7. In the present embodiment, the flow of the process when the control portion 90 performs the liquid droplet detection corresponds to a method for controlling the liquid discharge apparatus 100.

In step S11, the control portion 90 adjusts the gap G between the nozzle surface 11 and the center of the irradiating portion 71. Specifically, the control portion 90 controls the detection portion moving mechanism 75 of the liquid droplet detection mechanism 70 to change a position of the detection portion 73 in the Z-axis direction and adjust the gap G to the detection gap Gs. In other words, the control portion 90 controls the detection portion moving mechanism 75 of the liquid droplet detection mechanism 70 to change the gap G.

For example, when the detection portion 73 is positioned at the standby position, the control portion 90 controls the detection portion moving mechanism 75 to change the gap G from the standby gap Gt to the detection gap Gs. In addition, for example, the position of the liquid discharge portion 10 in the Z-axis direction may be changed in order to maintain a gap PG between the printing paper M and the nozzle surface 11 of the liquid discharge portion 10 according to a change in thickness of the printing paper M, or to change the gap PG according to a change in printing mode. In such a case, the control portion 90 controls the detection portion moving mechanism 75 to move the detection portion 73 in the Z-axis direction. As a result, the control portion 90 moves the detection portion 73 in the Z-axis direction and adjusts the gap G to the detection gap Gs in correspondence to the movement of the position of the liquid discharge portion 10 in the Z-axis direction.

Moreover, in the liquid droplet Id adhering to the nozzle surface 11, the size of the liquid droplet Id that may fall off from the nozzle surface 11 during the printing operation varies depending on a magnitude of the force applied to the liquid droplet Id. The liquid discharge apparatus 100 of the present embodiment can perform the printing operation by a first printing mode in which the ink is discharged from the nozzles N of the liquid discharge portion 10 and printing is performed while moving the carriage 42 in the X-axis direction at a first speed, and a second printing mode in which the printing is performed while moving the carriage 42 in the X-axis direction at a second speed lower than the first speed.

In this case, since in the first printing mode and the second printing mode, moving speeds of the carriage 42 in the X-axis direction in the printing operation are different, the forces applied to the liquid droplet Id are also different, and the sizes of the liquid droplet Id that may fall off from the nozzle surface 11 during the printing operation may be different. When the size of the liquid droplet Id that may fall off from the nozzle surface 11 during the printing is changed, the detected protrusion amount Th is also changed.

When the detected protrusion amount Th is changed, it is necessary to change a set value of the detection gap Gs that is set to be the same as the detected protrusion amount Th. Thus, when performing the liquid droplet detection, the control portion 90 changes the set value of the detection gap Gs according to the moving speed of the carriage 42 in the X-axis direction in the printing operation. In other words, when performing the liquid droplet detection, the control portion 90 changes the detection gap Gs according to the moving speed of the liquid discharge portion 10 in the X-axis direction at the time of printing.

Specifically, the control portion 90 sets the set value of the detection gap Gs when performing the printing in the first printing mode to be smaller than the set value of the detection gap Gs when performing printing in the second mode. In other words, the control portion 90 sets the set value of the detection gap Gs when performing the printing in the first printing mode to be smaller than that when performing printing in the second mode.

Moreover, in the liquid droplet Id adhering to the nozzle surface 11, the size of the liquid droplet Id that may fall off from the nozzle surface 11 during the printing operation varies depending on the temperature of atmosphere of the liquid droplet Id. Therefore, the control portion 90 changes the set value of the detection gap Gs based on the temperature detected by the temperature detection portion 81. In other words, the control portion 90 changes the detection gap Gs according to the temperature of atmosphere in which the liquid discharge portion 10 is provided.

As the temperature of the ink increases, a viscosity of the ink decreases. Therefore, even if the protrusion amount T of the liquid droplet Id adhering to the nozzle surface 11 is the same, the liquid droplet Id is more likely to fall off from the nozzle surface 11 at a first temperature, which is the temperature of atmosphere in which the liquid discharge portion 10 is provided, than at a second temperature lower than the first temperature. In this case, at the first temperature which is the temperature of atmosphere in which the liquid discharge portion 10 is provided, the control portion 90 sets the detection gap Gs to be smaller than that at the second temperature.

Moreover, in the liquid droplet Id adhering to the nozzle surface 11, the size of the liquid droplet Id that may fall off from the nozzle surface 11 during the printing operation varies depending on the humidity of atmosphere of the liquid droplet Id. Therefore, the control portion 90 changes the set value of the detection gap Gs based on the humidity detected by the humidity detection portion 82. In other words, the control portion 90 changes the detection gap Gs according to the humidity of atmosphere in which the liquid discharge portion 10 is provided.

For example, assuming that a solvent of the ink is water. Comparison is made between a case in which a first humidity is the humidity of atmosphere in which the liquid discharge portion 10 is provided and a predetermined time has elapsed in a state where the liquid droplet Id adheres to the nozzle surface 11 and a case in which a second humidity lower than the first humidity is the humidity of atmosphere and a predetermined time has elapsed in a state in which the liquid droplet Id adheres to the nozzle surface 11. In this case, the liquid droplet Id that has elapsed a predetermined time under the first humidity has less moisture evaporation therefrom and lower viscosity than the liquid droplet Id that has elapsed a predetermined time under the second humidity. Accordingly, even if the protrusion amount T of the liquid droplet Id adhering to the nozzle surface 11 is the same, the liquid droplet Id that has elapsed a predetermined time under the first humidity is more likely to fall off from the nozzle surface 11 than the liquid droplet Id that has elapsed a predetermined time under the second humidity. Thus, at the first temperature which is the temperature of atmosphere in which the liquid discharge portion 10 is provided, the control portion 90 may set the detection gap Gs to be smaller than that at the second temperature.

In step S11, when adjusting the gap G, the control portion 90 shifts the process to step S12.

In step S12, the control portion 90 detects the liquid droplet. Specifically, the control portion 90 controls the moving mechanism 40 to move the carriage 42 in the X-axis direction on the −Z direction side of the detection region SA, in a state where the irradiation light L is radiated from the irradiating portion 71 of the detection portion 73 toward the light receiving portion 72. As a result, the liquid discharge portion 10 of which the gap G is the detection gap Gs moves in the X-axis direction above the detection portion 73 on the −Z direction side of the detection portion 73. As a result, the irradiation light L radiated from the irradiating portion 71 toward the light receiving portion 72 in the −Y direction passes through the +Z direction side of the nozzle surface 11.

For example, in the printing detection, when changing a moving direction of the carriage 42 at the time of printing, the control portion 90 performs the liquid droplet detection by causing the irradiating portion 71 of the detection portion 73 to radiate the irradiation light L toward the light receiving portion 72 at a timing when the nozzle surface 11 passes through a portion of the detection portion 73 on the −Z direction side. That is, the control portion 90 performs the printing detection either when the carriage 42 moves from the printing region PA to the maintenance region RA on the +X direction side of the detection portion 73 or when the carriage 42 moves from the maintenance region RA to the printing region PA.

For example, in the non-printing detection, the control portion 90 performs the liquid droplet detection by moving the carriage 42 from the standby position of the carriage 42 in the −X direction and moving the carriage 42 in the −X direction on the −Z direction side of the detection portion 73 in which the irradiation light L is radiated from the irradiating portion 71. In the non-printing detection, the control portion 90 makes a moving speed when the carriage 42 moves on the −Z direction side of the detection portion 73 in which the irradiation light L is radiated from the irradiating portion 71 lower than a moving speed of the carriage 42 in the X-axis direction at the time of printing. In other words, when performing the non-printing detection, the control portion 90 makes a moving speed of the liquid discharge portion 10 in the X-axis direction lower than that at the time of printing.

In step S12, when performing the liquid droplet detection, the control portion 90 shifts the process to step S13.

In step S13, the control portion 90 confirms whether or not the liquid droplet Id of the detected protrusion amount Th or more is detected in the liquid droplet detection. In the liquid droplet detection, when the light receiving amount RA of the irradiation light L received by the light receiving portion 72 is larger than the detected light receiving amount RAt, the control portion 90 determines that the liquid droplet Id of which the protrusion amount T is the same as or larger than the detected protrusion amount Th does not adhere to the nozzle surface 11. Thus, step S13 is NO. The control portion 90 completes the process when the liquid droplet detection is performed.

In the liquid droplet detection, when the light receiving amount RA of the irradiation light L received by the light receiving portion 72 is the same as or smaller than the detected light receiving amount RAt, the control portion 90 determines that the liquid droplet Id of which the protrusion amount T is the same as or larger than the detected protrusion amount Th adheres to the nozzle surface 11. Thus, step S13 is YES. The control portion 90 shifts the process to step S14.

In step S14, the control portion 90 performs the maintenance operation. In the maintenance operation, the control portion 90 causes the removal member 61 or 64 to contact the liquid droplet Id adhering to the liquid discharge portion 10. In other words, when the liquid droplet Id of the detected protrusion amount Th or more is detected in the liquid droplet detection, the control portion 90 moves the liquid discharge portion 10 in the X-axis direction and the liquid droplet Id is brought into contact with the removal member 61 or 64.

For example, in a case in which the liquid droplet Id of the detected protrusion amount Th or more is detected in the printing detection performed when the carriage 42 moves from the printing region PA to the +X direction, the control portion 90 performs the liquid droplet detection, and then passes the carriage 42 through a portion of the removal member 61 on the −Z direction side that has moved to the removal position. In addition, for example, when the liquid droplet Id of the detected protrusion amount Th or more is detected in the printing detection performed when the carriage 42 moves from the +X direction side of the printing region PA to the printing region PA, the control portion 90 performs the liquid droplet detection, and then passes the carriage 42 through the portion of the removal member 64 on the −Z direction side that has moved to the removal position.

In other words, when the liquid droplet Id of the detected protrusion amount Th or more is detected in the printing detection, the control portion 90 performs the maintenance operation of removing the liquid droplet Id adhering to the liquid discharge portion 10 by bringing the liquid droplet Id adhering to the nozzle surface 11 into contact with either the removal member 61 or the removal member 64, which is positioned ahead in the moving direction when the liquid discharge portion 10 moves in the X-axis direction on the −Z direction side of the detection portion 73 in the liquid droplet detection.

For example, when the liquid droplet Id of the detected protrusion amount Th or more is detected in the non-printing detection, the control portion 90 performs the liquid droplet detection, and then passes the carriage 42 through the portion of the removal member 61 on the −Z direction side that has moved to the removal position, thereby performing the maintenance operation of removing the liquid droplet Id adhering to the nozzle surface 11 of the liquid discharge portion 10. Accordingly, the carriage 42 can reduce a distance by which the carriage 42 moves above the printing paper M in a state where the liquid droplet Id of the detected protrusion amount Th or more adheres to the nozzle surface 11, in the maintenance operation of removing the liquid droplet Id adhering to the liquid discharge portion 10.

For example, assuming that one liquid droplet Id of the detected protrusion amount Th or more is detected in the liquid droplet detection. In this case, the control portion 90 moves the carriage 42 to either the removal member 61 or the removal member 64, which is positioned ahead in the moving direction when the liquid discharge portion 10 moves in the X-axis direction on the −Z direction side of the detection portion 73 in the liquid droplet detection, in a state where the removal member 61 or 64 is at the standby position.

The control portion 90 stops the carriage 42 at a position where the upper surface Ts of either the removal member 61 or the removal member 64 positioned ahead in the moving direction face the detected liquid droplet Id. The control portion 90 may perform the maintenance operation of removing the liquid droplet Id adhering to the liquid discharge portion 10, by moving either the removal member 61 or the removal member 64 of which the upper surface Ts face the liquid droplet Id from the standby position to the removal position and bringing either the removal member 61 or the removal member 64 into contact with the liquid droplet Id adhering to the liquid discharge portion 10.

When performing the process in step S14, the control portion 90 completes the process when the liquid droplet detection is performed.

As described above, according to the liquid discharge apparatus 100 according to the first embodiment and the method for controlling the liquid discharge apparatus 100, the following effect can be obtained.

The liquid discharge apparatus 100 includes the liquid discharge portion 10 capable of discharging the ink from the nozzles N provided in the nozzle surface 11, the moving mechanism 40 capable of moving the liquid discharge portion 10 in the X-axis direction when printing is performed on the printing paper M by discharging the ink from the nozzles N, the detection portion 73 capable of detecting the liquid droplet Id adhering to the nozzle surface 11, including the irradiating portion 71 capable of radiating the irradiation light L along the nozzle surface 11 in the Y-axis direction intersecting the X-axis direction, and a light receiving portion 72 capable of receiving the irradiation light L radiated from the irradiating portion 71 and provided on a side of the irradiating portion 71 opposite to the nozzle surface 11 in the Y-axis direction, and the control portion 90. In a case in which the detection gap Gs is the gap G between the nozzle surface 11 and the detection portion 73 in the Z-axis direction when performing the liquid droplet detection of detecting the liquid droplet Id, in the liquid droplet detection, the control portion 90 controls the moving mechanism 40 in a state where the irradiating portion 71 is caused to radiate the irradiation light L, and moves the liquid discharge portion 10 of which the gap G is the detection gap Gs in the X-axis direction on the −Z direction side of the detection portion 73. Accordingly, the detection of the liquid droplet Id adhering to the nozzle surface 11 can be performed over the entirety of the nozzle surface 11.

The liquid discharge apparatus 100 further includes the detection portion moving mechanism 75 capable of moving the detection portion 73 in the Z-axis direction, and the control portion 90 controls the detection portion moving mechanism 75 to change the gap G. Accordingly, the gap G can be easily changed.

The liquid discharge apparatus 100 includes the removal members 61 and 64 capable of being brought into contact with the liquid droplet Id in the maintenance regions RA and LA which are regions positioned in the +Z direction of the liquid discharge portion 10 moving in the X-axis direction, and different from the printing region PA where the printing is performed. Accordingly, the liquid droplet Id adhering to the nozzle surface 11 can be removed. Further, when the removal member 61 or 64 is brought into contact with the liquid droplet Id or after the removal member 61 or 64 is brought into contact with the liquid droplet Id, the printing region PA is hardly contaminated by the liquid droplet Id.

When the liquid droplet Id is detected in the liquid droplet detection, the control portion 90 moves the liquid discharge portion 10 in the X-axis direction and the liquid droplet Id is brought into contact with the removal member 61 or 64. Accordingly, the liquid droplet Id can be removed from the nozzle surface 11 before the liquid droplet Id adhering to the nozzle surface 11 falls off.

The method for controlling the liquid discharge apparatus 100 including the liquid discharge portion 10 capable of discharging the ink from the nozzles N provided in the nozzle surface 11 and capable of moving in the X-axis direction when printing is performed on the printing paper M by discharging the ink from the nozzles N, the detection portion 73 capable of detecting the liquid droplet Id adhering to the nozzle surface 11, including the irradiating portion 71 capable of radiating the irradiation light L along the nozzle surface 11 in the Y-axis direction intersecting the X-axis direction, and a light receiving portion 72 capable of receiving the irradiation light L radiated from the irradiating portion 71 and provided on a side of the irradiating portion 71 opposite to the nozzle surface 11 in the Y-axis direction, and the control portion 90, in which in a case in which the detection gap Gs is the gap G between the nozzle surface 11 and the detection portion 73 in the Z-axis direction when performing the liquid droplet detection of detecting the liquid droplet Id, in the liquid droplet detection, the liquid discharge portion 10 of which the gap G is the detection gap Gs moves in the X-axis direction on the −Z direction side of the detection portion 73, in a state where the irradiating portion 71 is caused to radiate the irradiation light L. Accordingly, the detection of the liquid droplet Id adhering to the nozzle surface 11 can be performed over the entirety of the nozzle surface 11.

In the method for controlling the liquid discharge apparatus 100, when the printing is performed in the first printing mode of performing printing, while moving the liquid discharge portion 10 in the X-axis direction at the first speed, the detection gap Gs is set to be smaller than that when the printing is performed in the second printing mode of performing printing, while moving the liquid discharge portion 10 in the X-axis direction at the second speed lower than the first speed. Accordingly, even if the printing is performed in the printing mode having a different moving speed of the liquid discharge portion 10, falling off of the liquid droplet Id adhering to the nozzle surface 11 is easily suppressed.

In the method for controlling the liquid discharge apparatus 100, the detection gap Gs is changed according to the temperature of atmosphere in which the liquid discharge portion 10 is provided. Accordingly, the detection gap Gs can be changed according to a change in temperature that may change the size of the liquid droplet Id falling off from the nozzle surface 11.

In the method for controlling the liquid discharge apparatus 100, the detection gap Gs is changed according to the humidity of atmosphere in which the liquid discharge portion 10 is provided. Accordingly, the detection gap Gs can be changed according to a change in humidity that may change the size of the liquid droplet Id falling off from the nozzle surface 11.

In the method for controlling the liquid discharge apparatus 100, when performing the liquid droplet detection at the time of non-printing in which the printing is not performed, the moving speed of the liquid discharge portion 10 in the X-axis direction is lower than that at the time of printing. Accordingly, the liquid droplet Id adhering to the nozzle surface 11 hardly falls off in the liquid droplet detection performed at the time of non-printing.

In the method for controlling the liquid discharge apparatus 100, when the liquid droplet Id is detected in the liquid droplet detection, the liquid discharge portion 10 moves in the X-axis direction, and the liquid droplet Id is brought into contact with the removal member 61 or 64 provided in the maintenance region RA or LA which is different from the printing region PA where the printing is performed. Accordingly, the liquid droplet Id can be removed from the nozzle surface 11 before the liquid droplet Id adhering to the nozzle surface 11 falls off.

In the method for controlling the liquid discharge apparatus 100, when the liquid droplet Id is detected in the liquid droplet detection, the liquid droplet Id is brought into contact with either the removal member 61 or the removal member 64 provided ahead in the moving direction when the liquid discharge portion 10 moves in the X-axis direction on the −Z direction side of the detection portion 73 in the liquid droplet detection. Accordingly, for example, when the liquid droplet Id is detected at the time of printing and removed from the nozzle surface 11, a time required to remove the liquid droplet Id from the nozzle surface 11 can be shortened. Thus, a time required for printing can be shortened to some extent that the time required to remove the liquid droplet Id from the nozzle surface 11 is shortened.

The liquid discharge apparatus 100 and the method for controlling the liquid discharge apparatus 100 according to the embodiment of the present disclosure essentially include the above described configuration. However, it is needless to say that the configuration can be partially changed or omitted without departing from the spirit of the present disclosure. In addition, the embodiment described above and the following other embodiments may be performed in combination as long as no technical contradiction occurs. Hereinafter, other embodiments will be described.

In the embodiment, the detected protrusion amount Th of the liquid droplet Id detected by the liquid droplet detection may be the protrusion amount T of the liquid droplet Id having a low probability that the liquid droplet Id falls off from the nozzle surface 11 during printing. That is, the detected protrusion amount Th of the liquid droplet Id detected in the liquid droplet detection may be smaller than the protrusion amount T of the liquid droplet Id that may fall off from the nozzle surface 11 during the printing. In this case, for example, the maintenance operation may not be performed by the removal member 61 or 64 when the liquid droplet Id of the detected protrusion amount Th is detected in the liquid droplet detection. Further, when the liquid droplet detection is the printing detection, the maintenance operation may be performed by the removal member 61 or 64 after the printing is performed on the printing paper M, when the liquid droplet Id of the detected protrusion amount Th is detected in the liquid droplet detection.

In the embodiment, when the liquid droplet detection is performed multiple times at the time of printing, the detected protrusion amount Th of the liquid droplet Id detected in each liquid droplet detection may be different. That is, the detection gap Gs in each liquid droplet detection may be different. For example, the detection gap Gs may be increased each time the liquid droplet detection is performed. In this case, the maintenance operation may be performed by the removal member 61 or 64 when the liquid droplet Id of the detected protrusion amount Th is detected in the liquid droplet detection performed at the largest detection gap Gs among the set detection gaps Gs.

In the embodiment, when the liquid droplet Id of the detected protrusion amount Th is detected in the liquid droplet detection, the maintenance operation of removing the liquid droplet Id from the nozzle surface 11 may be performed by bringing the wiper 51 into contact with the liquid droplet Id. In this case, it can be said that the wiper 51 is an example of the cleaning portion. For example, the maintenance operation may be performed by either the removal member 64 or the wiper 51, when the liquid droplet Id of the detected protrusion amount Th is detected in the printing detection. Alternatively, when the liquid droplet Id of the detected protrusion amount Th is detected in the printing detection, the maintenance operation may be performed by the removal member 61 or 64, and when the liquid droplet Id of the detected protrusion amount Th is detected in the non-printing detection, the maintenance operation may be performed by the wiper 51. Further, the maintenance operation of removing the liquid droplet Id from the nozzle surface 11 may be performed by bringing the cap 53 into contact with the liquid droplet Id, as long as the liquid droplet Id can be removed from the nozzle surface 11.

In the embodiment, the removal member 61 may be provided at a position different from the position between the liquid droplet detection mechanism 70 and the wiper 51 in the X-axis direction, as long as the position is a region positioned in the +Z direction of the liquid discharge portion 10 moving in the X-axis direction. For example, the removal member 61 may be provided at a position between the wiper 51 and the cap 53 in the X-axis direction, or positioned on the +X direction side of the cap 53. Alternatively, the removal member 61 may not be provided.

In the embodiment, the liquid droplet detection mechanism 70 may be provided at a position different from the position between the medium support portion 37 and the removal member 61 in the X-axis direction, as long as the position is a region positioned in the +Z direction of the liquid discharge portion 10 moving in the X-axis direction. For example, the liquid droplet detection mechanism 70 may be provided at the position between the medium support portion 37 and the removal member 64 in the X-axis direction. Alternatively, the liquid droplet detection mechanism 70 may be positioned on the +X direction side of the maintenance portion 50 in the X-axis direction, or positioned on the −X direction side of the removal member 64 in the X-axis direction.

In the embodiment, the irradiating portion 71 of the liquid droplet detection mechanism 70 may radiate the irradiation light L along the nozzle surface 11 in an irradiating direction intersecting the X-axis direction and the Y-axis direction. In this case, the light receiving portion 72 of the liquid droplet detection mechanism 70 may be provided on an opposite side of the nozzle surface 11 from the irradiating portion 71 in the irradiating direction described above so that the irradiation light L radiated from the irradiating portion 71 can be received. That is, the irradiating portion 71 and the light receiving portion 72 may be provided in the detection portion 73 so that the nozzle surface 11 is positioned between the irradiating portion 71 and the light receiving portion 72 in the irradiating direction.

In the embodiment, the width dimension in the Z-axis direction of light flux of the irradiation light L radiated from the irradiating portion 71 of the liquid droplet detection mechanism 70 may be set sufficiently larger than the protrusion amount T of the liquid droplet Id that may fall off from the nozzle surface 11. The detection gap Gs may not be the same as the detected protrusion amount Th. In this case, for example, the detection gap Gs may be set so that the position of an end of the light flux of the irradiation light L in the −Z direction is the same as the position of the nozzle surface 11 in the Z-axis direction or the end of the light flux of the irradiation light L is positioned in the −Z direction relative to the nozzle surface 11. It is determined whether or not the liquid droplet Id adheres to the nozzle surface 11 and the protrusion amount T of the liquid droplet Id based on the light receiving amount RA of the irradiation light L received by the light receiving portion 72, and the maintenance operation of removing the liquid droplet Id from the nozzle surface 11 may be performed, if necessary.

In the embodiment, the width dimension in the Z-axis direction of light flux of the irradiation light L radiated from the irradiating portion 71 of the liquid droplet detection mechanism 70 may be set sufficiently larger than the protrusion amount T of the liquid droplet Id that may fall off from the nozzle surface 11. In order to change the gap PG between the medium and the nozzle surface 11 of the liquid discharge portion 10 according to the change in thickness of the medium, or in order to change the gap PG according to the change in printing mode, when the position of the liquid discharge portion 10 in the Z-axis direction is changed, it may be determined whether or not the liquid droplet Id adheres to the nozzle surface 11 and the protrusion amount T of the liquid droplet Id in each gap PG based on a magnitude of the light receiving amount RA of the irradiation light L received by the light receiving portion 72. As a result, the detection portion moving mechanism 75 does not have to be provided because it is not required to move the detection portion 73 when the gap PG is changed.

In the embodiment, the liquid droplet detection mechanism 70 may detect a flying liquid droplet discharged from the nozzles N of the liquid discharge portion 10. For example, in a state where the detection portion 73 is at the standby position and the irradiation light L is radiated from the irradiating portion 71, the ink is discharged from the nozzles N of the liquid discharge portion 10 positioned on the −Z direction side of the detection portion 73. The irradiation light L is blocked by the flying liquid droplet discharged from the nozzles N, such that it may be determined whether or not the ink is normally discharged from the nozzles N based on the change in the light receiving amount RA of the irradiation light L received by the light receiving portion 72. In this case, for example, at the time of printing, the carriage 42 performs the printing detection when moving from the printing region PA toward the maintenance region RA on the +X direction side of the detection portion 73. After the detection portion 73 moves from the liquid droplet detection position to the standby position, the carriage 42 may perform detection of the flying liquid droplet when moving from the maintenance region RA to the printing region PA.

In the embodiment, the transport mechanism 30 may not include the transport roller 32. For example, the transport mechanism 30 may move the medium support portion 37, on which the printing paper M, a resin film, cloth, or the like as an example of the medium is mounted, in the Y-axis direction, to transport the medium to the printing region PA. Alternatively, instead of the medium support portion 37, the transport mechanism 30 may include an adhesive belt provided in the printing region PA and wound around a pair of winding rollers. In this case, the transport mechanism 30 rotates the pair of winding rollers to rotate the adhesive roller, and elongated cloth as an example of the medium attached to the adhesive belt may thus be transported to the printing region PA.

What is claimed is:

1. A liquid discharge apparatus comprising:

a liquid discharge portion configured to discharge a liquid from a nozzle provided in a nozzle surface;

a moving mechanism configured to move the liquid discharge portion in a scanning direction when the liquid discharge portion performs printing on a medium by discharging the liquid from the nozzle;

a detection portion configured to detect a liquid droplet adhering to the nozzle surface, the detection portion including an irradiating portion configured to radiate irradiation light along the nozzle surface in an irradiating direction intersecting the scanning direction, a light receiving portion provided downstream of the nozzle surface in the irradiating direction and configured to receive the irradiation light radiated from the irradiating portion, and a detection portion moving mechanism configured to move the detection portion in the normal direction; and a control portion, wherein when liquid droplet detection of detecting the liquid droplet is performed, a gap between the nozzle surface and the detection portion in a normal direction of the nozzle surface is set to a detection gap, in the liquid droplet detection, the control portion controls the irradiating portion to radiate the irradiation light, the moving mechanism to move the liquid discharge portion of which the gap is set to the detection gap in the scanning direction, and the detection portion moving mechanism to change the gap.

2. The liquid discharge apparatus according to claim 1, further comprising:

a cleaning portion configured to be brought into contact with the liquid droplet in a region positioned below the liquid discharge portion and different from a printing region where the printing is performed in the scanning direction.

3. The liquid discharge apparatus according to claim 2, wherein when the liquid droplet is detected in the liquid droplet detection, the control portion moves the liquid discharge portion in the scanning direction and the liquid droplet is brought into contact with the cleaning portion.

4. A method for controlling a liquid discharge apparatus including a liquid discharge portion configured to discharge a liquid from a nozzle provided in a nozzle surface and move in a scanning direction when the liquid discharge portion performs printing on a medium by discharging the liquid from the nozzle, and a detection portion configured to detect a liquid droplet adhering to the nozzle surface, the detection portion including an irradiating portion configured to radiate irradiation light along the nozzle surface in an irradiating direction intersecting the scanning direction, and a light receiving portion provided downstream of the nozzle surface in the irradiating direction and configured to receive the irradiation light radiated from the irradiating portion, the method comprising when the liquid droplet detection of detecting the liquid droplet is performed, a gap between the nozzle surface and the detection portion in a normal direction of the nozzle surface is set to a detection gap, moving, in the liquid droplet detection, in a state where the irradiating portion is caused to radiate the irradiation light, the liquid discharge portion of which the gap is set to the detection gap in the scanning direction, wherein when the printing is performed in a first printing mode of performing printing while the liquid discharge portion is moved in the scanning direction at a first speed, the detection gap is set to smaller than the detection gap when the printing is performed in a second printing mode of performing printing while the liquid discharge portion is moved in the scanning direction at a second speed lower than the first speed.

5. The method for controlling a liquid discharge apparatus according to claim 4, wherein the detection gap is changed according to a temperature of atmosphere in which the liquid discharge portion is provided.

6. The method for controlling a liquid discharge apparatus according to claim 4, wherein the detection gap is changed according to a humidity of atmosphere in which the liquid discharge portion is provided.

7. The method for controlling a liquid discharge apparatus according to claim 4, wherein when the liquid droplet detection is performed at a time of non-printing in which the printing is not performed, a moving speed of the liquid discharge portion in the scanning direction is lower than the moving speed at a time of the printing.

8. The method for controlling a liquid discharge apparatus according to claim 4, wherein when the liquid droplet is detected in the liquid droplet detection, the liquid discharge portion is moved in the scanning direction, and the liquid droplet is brought into contact with the cleaning portion provided in a region different from a printing region where the printing is performed.

9. The method for controlling a liquid discharge apparatus according to claim 8 wherein when the liquid droplet is detected in the liquid droplet detection, the liquid droplet is brought into contact with the cleaning portion provided ahead in a moving direction when the liquid discharge portion moves, in the liquid droplet detection, above the detection portion in the scanning direction.

10. A liquid discharge apparatus comprising:

a liquid discharge portion configured to discharge a liquid from a nozzle provided in a nozzle surface;

a moving mechanism configured to move the liquid discharge portion in a scanning direction when the liquid discharge portion performs printing on a medium by discharging the liquid from the nozzle;

a detection portion configured to detect a liquid droplet adhering to the nozzle surface, the detection portion including an irradiating portion configured to radiate irradiation light along the nozzle surface in an irradiating direction intersecting the scanning direction, the irradiating direction is parallel to the nozzle surface, and a light receiving portion provided downstream of the nozzle surface in the irradiating direction and configured to receive the irradiation light radiated from the irradiating portion; and a control portion, wherein when liquid droplet detection of detecting the liquid droplet is performed, a gap between the nozzle surface and the detection portion in a normal direction of the nozzle surface is set to a detection gap, in the liquid droplet detection, the control portion controls the irradiating portion to radiate the irradiation light, and the moving mechanism to move the liquid discharge portion of which the gap is set to the detection gap in the scanning direction.

* * * * *